US007532611B1

(12) United States Patent
Jacks, Jr.

(10) Patent No.: US 7,532,611 B1
(45) Date of Patent: May 12, 2009

(54) CONTROLLING WIRELESS COMMUNICATIONS BETWEEN LINKED DEVICES

(75) Inventor: Edwin L. Jacks, Jr., Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 2099 days.

(21) Appl. No.: 09/614,826

(22) Filed: Jul. 12, 2000

(51) Int. Cl.
*H04J 3/24* (2006.01)
*H04M 11/00* (2006.01)
*G08C 19/00* (2006.01)
*G05B 11/01* (2006.01)

(52) U.S. Cl. .................. 370/349; 370/342; 340/825.69; 700/12; 379/93.08

(58) Field of Classification Search ................. 710/5–9, 710/24, 62–74; 370/259, 277, 278, 310–313, 370/328, 395, 52, 352–356, 342–349, 350, 370/392–394, 409, 389, 390; 700/12, 17, 700/83, 296; 340/825.69, 825.72, 2.1, 825.98; 379/88.26, 93.08, 93.17
See application file for complete search history.

(56) References Cited

U.S. PATENT DOCUMENTS 5,559,804 A * 9/1996 Amada et al. ............... 370/347
5,617,561 A * 4/1997 Blaauw et al. ................ 703/26
5,881,366 A * 3/1999 Bodenmann et al. ....... 455/41.2
5,926,756 A * 7/1999 Piosenka et al. ............ 455/418
6,195,712 B1 * 2/2001 Pawlowski et al. ............ 710/19
6,308,227 B1 * 10/2001 Kumar et al. .................. 710/4
6,384,737 B1 * 5/2002 Hsu et al. .............. 340/825.69

* cited by examiner

*Primary Examiner*—Afsar M. Qureshi
(74) *Attorney, Agent, or Firm*—Trop, Pruner & Hu, P.C.

(57) ABSTRACT

A system for implementing a relatively reliable wireless transmission protocol for a processor-based system includes generating commands associated with a predetermined number of command identifiers. Thus, no more than the predetermined number of commands may be issued until a responding device responds with a previously used command identifier. When a device responds that it has received a command with a given identifier, that identifier then becomes available for reuse. Thereafter, a new command may be issued by re-using that command identifier. In this way, the system may keep track of all the outstanding commands, ensuring that a lost command will be detected. By limiting the number of command identifiers, the requirements of the receiving and transmitting devices in terms of processing power and/or memory capacity may be effectively limited.

19 Claims, 4 Drawing Sheets

CONTROLLING WIRELESS COMMUNICATIONS BETWEEN LINKED DEVICES

BACKGROUND

This invention relates generally to communications between linked devices such as a processor-based system and its peripherals.

The remote control of processor-based systems has many advantages. For example, wireless keyboards and mice are advantageous since the user is not tethered by connecting cables. In addition, the need to initially connect the devices together by wired connections is eliminated. More than one user may provide input commands to a single processor-based system using radio frequency links.

Problems may arise however in connection with the use of wireless linked components or peripherals. Commands issued from the processor-based system to the peripheral devices may be lost and left unaccounted for. As a result, the system may not be able to rely on the accuracy of communications with the peripheral devices.

Thus, there is a continuing need for techniques to implement reliable wireless communication between a processor-based system and its peripherals and particularly to such techniques which do not unduly increase the cost of those peripherals.

DETAILED DESCRIPTION

Figure 1:
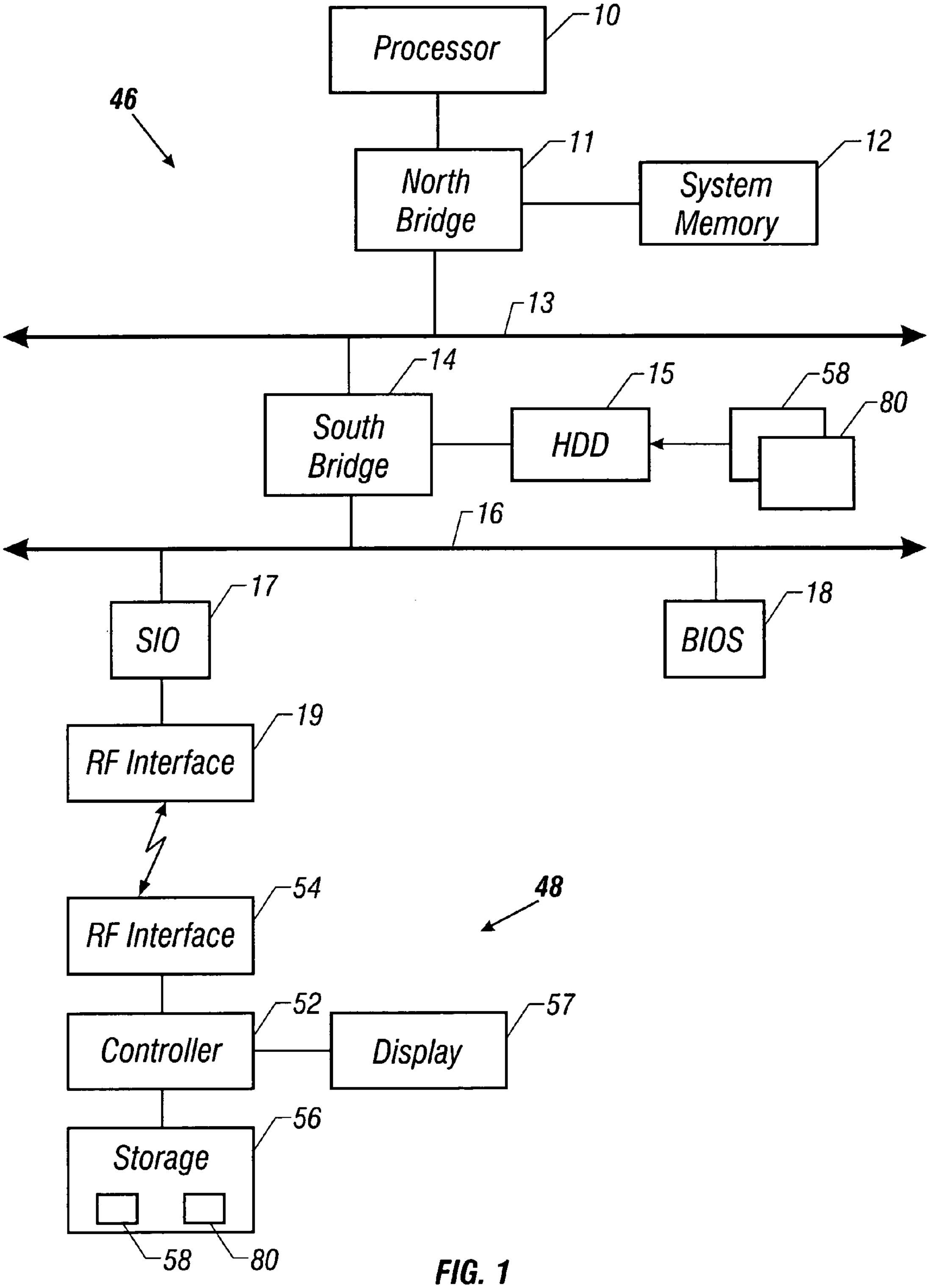
FIG. 1 is a block diagram showing one embodiment of the present invention.

Referring to FIG. 1, a processor-based system 10 may include a base station 46, which in one embodiment of the present invention may include conventional components normally associated with a computer system such as a processor 10, a bridge 11, and a system memory 12. The processor-based system base station 12 may conventionally be a desktop computer, a mobile computer, a handheld computer, a set-top box or an appliance, as examples.

The base station 12 communicates with a display device 48 through a serial input/output (SIO) device 17 and a radio frequency (RF) interface 19. In particular, the bridge 11 may be coupled to a bus 13 which in turn is coupled to a bridge 14. The bridge 14 may be coupled to a storage device 15 such as a hard disk drive which stores software 58 and 80 for controlling the processor-based system base station 12. The south bridge 14 is also coupled to a bus 16 which in turn is coupled to the SIO device 17 and a basic input/output system (BIOS) memory 18.

The display device 48 may include its own radio frequency interface 54 which acts as a transceiver to communicate with the RF interface 19 of the base station 12. The interface 54 is controlled by a controller 52. Also coupled to the controller 52 is a display unit 57. The RF interface 54 may be a unidirectional or bi-directional interface.

The controller 52 has associated storage 56 which stores information for transmission to other components and may store information received from other components. The storage 56 may also store the software 58 for generating commands and the software 80 for responding to commands. Coding key parameters in the storage 56, such as an Electrically Erasable and Programmable Read Only Memory (EEPROM), allows flexibility in configuring the component. That is, it is possible to reprogram the component if necessary or desirable.

In one embodiment of the present invention, the display device 48 may be maintained in a unitary housing which exposes a display 57. The display 57 may include control devices, such as a mouse and/or a keyboard. Also, coupled to the controller 52 is a storage 56 which may also contain versions of the software 58 and 80.

In one embodiment of the present invention, the communications between the base station 12 and the display device 48 are implemented by a wireless protocol. Particularly, in one embodiment of the present invention, the wireless protocol is a radio frequency (RF) protocol. For example, the radio frequency protocol may be in accordance with the Bluetooth Specification, Version 1.0B, dated Dec. 1, 1999 (available at www.bluetooth.com/developer/specification/specification.asp) which involves a 2.4 GHz RF link. For example, in one embodiment of the present invention, the system may utilize a frequency hopping spread spectrum system.

Figure 2:
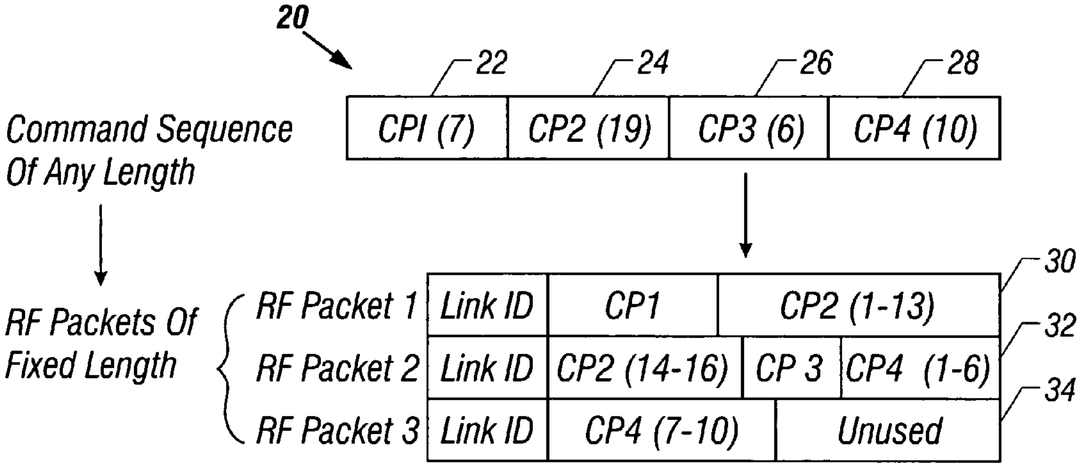
FIG. 2 is a schematic depiction of the technique for converting a command sequence into RF packets of fixed length in accordance with one embodiment of the present invention.

A command sequence 20 (FIG. 2) developed by any of the components 12, 14, 16 or 18 (FIG. 1) may be of various lengths and may include a number of command packets 22-28 as shown in FIG. 2. Each of the command packets may have a length. Thus, the illustrated command sequence 20 includes a first command packet 22 having a length of seven bytes, a second command packet 24 having a length of nineteen bytes, a third command packet 26 having a length of six bytes and a fourth command packet 28 having a length of ten bytes, as an illustrative example.

The command sequence 20 may be converted into radio frequency packets of a fixed length, such as twenty bytes, in one embodiment of the present invention. Thus, if the fixed length is chosen to be twenty bytes, three radio frequency packets 30, 32 and 34 are needed to transmit the illustrated command sequence 20. Thus, the first RF packet 30 includes the command packet 22 and part of the command packet 24. That is, the RF packet 30 includes the first thirteen bytes of the command packet 24. The remaining bytes of the command packet 24 are included at the beginning of the RF packet 32. The packet 32 also includes the command packet 26 and part of the command packet 28. The remainder of the command packet 28 is included in the RF packet 34. Thus, the command sequence 20 is broken into a series of RF packets of fixed length, breaking the command packets as necessary and carrying them over into an ensuing RF packet as needed. Each command packet 30, 32 and 34 also includes a link identifier.

Figure 3:
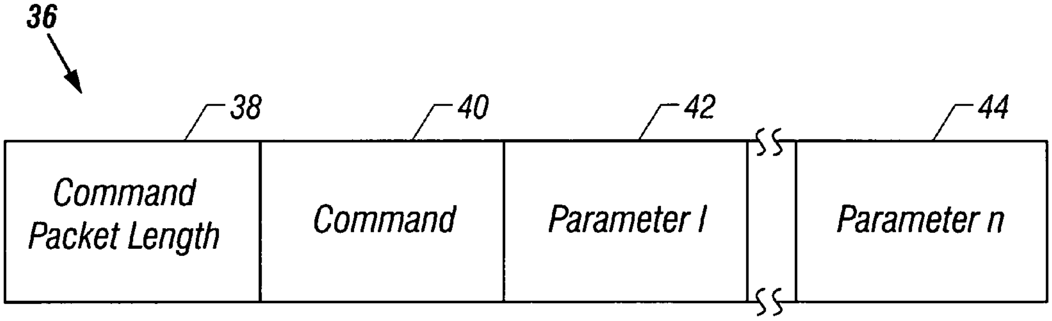
FIG. 3 is a depiction of a command packet in accordance with one embodiment of the present invention.

The command packets may have a format which facilitates wrapping the command packets from one RF packet to another as shown in FIG. 3. Namely, a command packet format 36 includes a field 38 which includes information about the command packet length. The command packet length is all that is needed to find the remainder of a command packet when it wraps from one RF packet to another. The body of the command packet format 36 includes a command field 40 and fields for any number of parameters indicated at 42 and 44.

Figure 4:
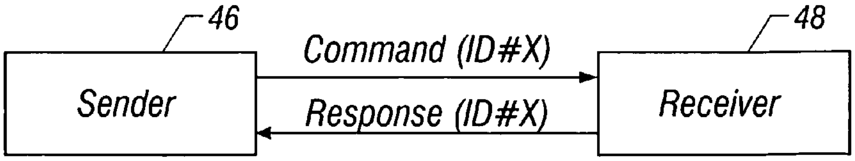
FIG. 4 shows the transmission of a command by a sender and a response from a receiver in accordance with one embodiment of the present invention.

Referring now to FIG. 4, a sender, which may be the base station 46, communicates with a receiver which may be the display device 48 or the base station 46. The sender 46 issues a command 36 in the form of a string of RF packets over a suitable carrier to the receiver 48. Since the RF packets 30, 32, and 34 include a link identifier number, the receiver 48 can determine which packets (of a predetermined set of active commands) it has received. By issuing the link identifier numbers sequentially, the receiver 48 can determine when a command 36 has been lost.

The receiver 48 may then respond, indicating by identifier number the command to which it is responding. Thus, the sender 46 may determine based on identifier number in the response whether a command that it issued had been lost or whether a response to its command has been lost. In this way, the sender 46 can re-send a command which was not received or not responded to.

Figure 5:
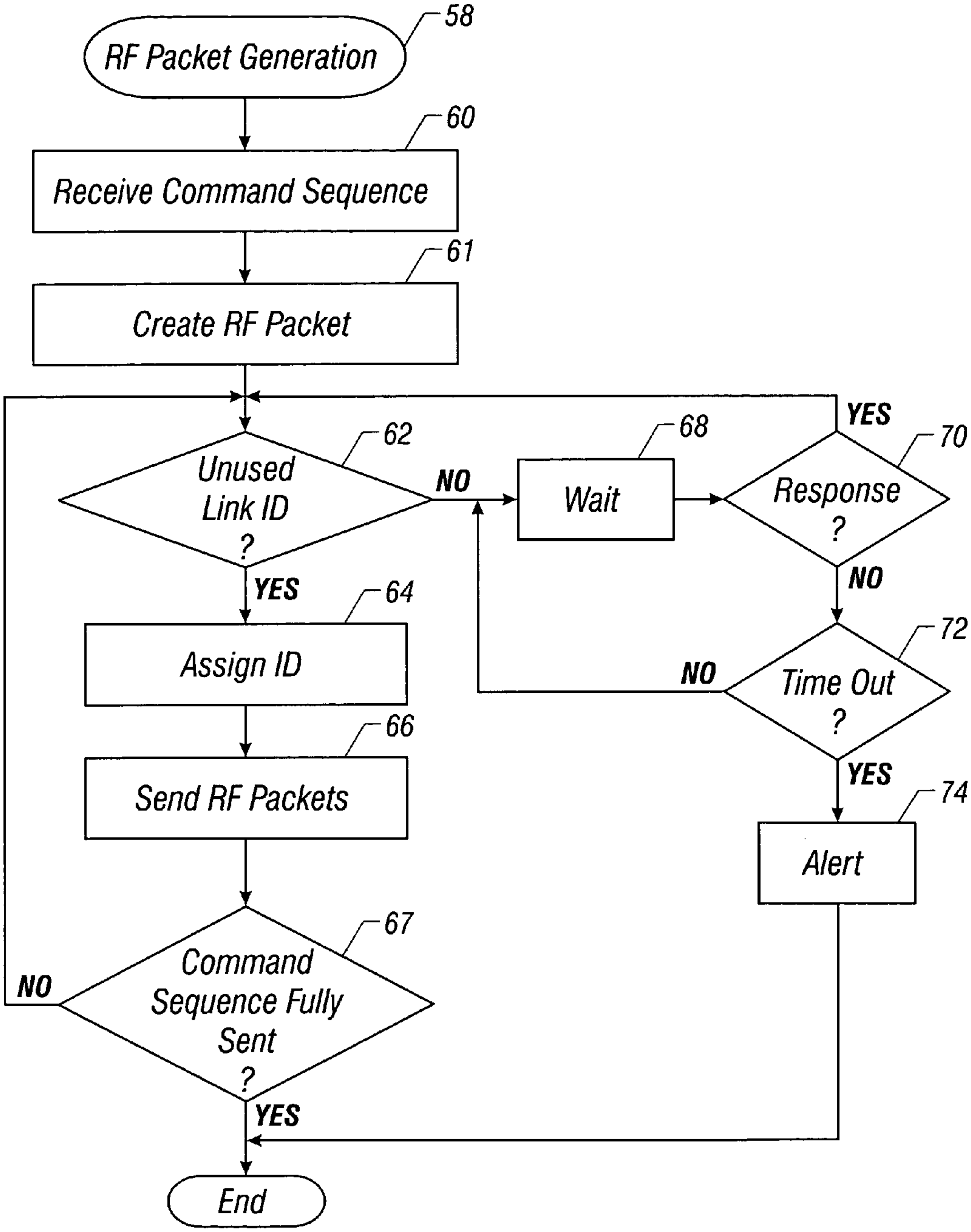
FIG. 5 is a flow chart showing software which may be used by the components of the system shown in FIG. 1 in accordance with one embodiment of the present invention.

Turning next to FIG. 5, the software 58 for generating commands in accordance with one embodiment of the invention begins by receiving command sequences 20 as indicated in block 60. At block 61, a RF packet 30 is created. At diamond 62, a check determines whether the next link identifier is unassigned. If so, then the link identifier may be assigned to the RF packet 64 and the RF packet may be sent (block 66). Next, as shown in decision block 67, if the entire command sequence has not been sent, then control returns to block 30 to send the next RF packet. Otherwise, the RF packet generation sequence terminates.

If no unused command identifiers are available as determined in diamond 62, the system waits as indicated in block 68. If a response has come in, as determined at diamond 70, the flow returns to diamond 62 to see if there is now an unused identifier.

If the response does not come in after waiting the predetermined amount of time, a check at diamond 72 determines whether there is a time out. If so, an alert is issued as indicated in block 74. Otherwise, the flow continues to wait an additional period at block 68.

Figure 6:
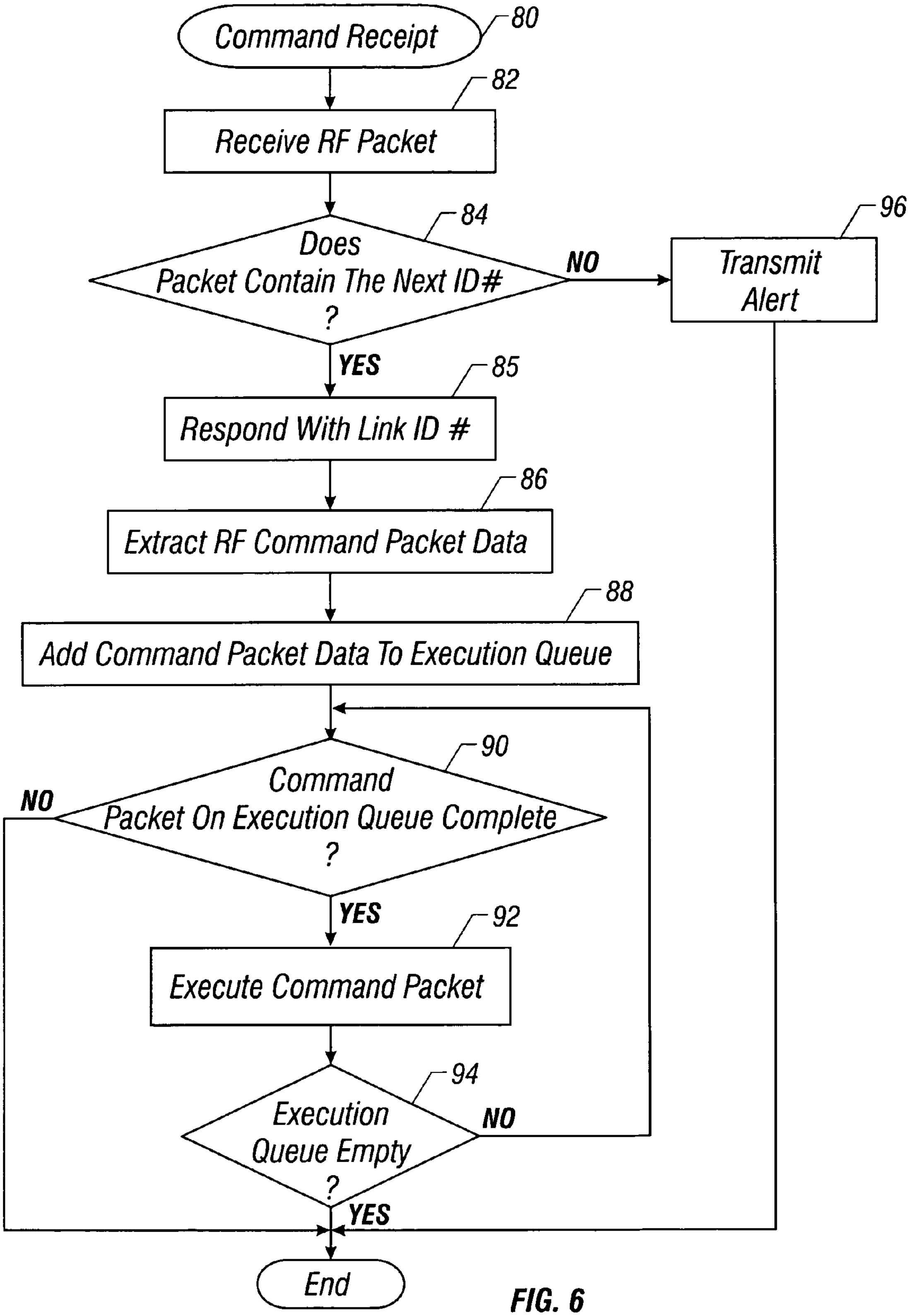
FIG. 6 is a flow chart for software which may be used by components shown in FIG. 1 to receive commands from another component in accordance with one embodiment of the present invention.

The software 80, shown in FIG. 6, controls the operation of a component that receives a command composed of RF packets (block 82) in accordance with one embodiment of the invention. At diamond 84, a check determines whether the link identifying number transmitted with the RF packets is the next identifier number in the sequence. The component responds to the sender with the link identifier number (block 82). The RF command packet data is extracted, as indicated in block 86, and the command packet data is added to an execution queue, as indicated in block 88.

A check at diamond 90 determines whether the command packet on the execution queue is complete. If so, the command packet is executed as indicated in block 92. If the execution queue is empty (diamond 94), the flow ends.

If the check at diamond 84 determines that the packet does not contain the next link identifier, then an alert is generated, as indicated in block 96, and the flow ends. Thus, each component in the system 10 advantageously keeps track of the packet identifier numbers for the commands issued by all the other components in the system. Limiting the number of identifiers that are available decreases the requirements placed on peripheral components, enabling a reasonable system cost.

In the following description details are provided for one embodiment of the invention. It is not intended that these details should limit the scope of the invention in any way.

A protocol may be utilized in connection with communications between the processor-based system base station 12 and the display device 14 in one embodiment of the invention. An insertion marker, also known as a caret, is overlaid on graphics to be displayed on the display device 14. The caret marks the point at which characters will be inserted. The command "Set Caret" defines the bit map for the caret, by parameters such as width, pixels, and mask. The command "HideCaret" hides the marker, the command "ShowCaret" shows the marker, and the command "PlaceCaret", including x and y parameters, moves the marker.

The processor-based system base station 12 issues the command set_caret to define the size and structure of the caret. The caret is overlaid on the current structure and therefore the set_caret routine restores the previous bits as part of moving and redrawing the caret. The station 12 issues the command hide_caret to remove the overlaid caret from the display. The base station 12 issues the command show_caret to show the caret overlay, and the command place_caret sets the upper-left corner of the caret.

The display device 14 may enable the user to perform custom graphics. Text or glyph commands enable the display device 14 to select and place a glyph rather than actually rendering a character. Several sets of glyphs may be resident in non-volatile memory on the display device 14 and other sets of glyphs may be downloaded.

Printed characters have a font, face and size. The font is the overall look of the characters, the face refers to style such as bold or italics and size refers to the point size. A glyph set is the rendering of a given font, size and style. The glyphs may be firmware based or downloaded. The downloaded glyphs are rendered on the base station 12 and downloaded prior to usage.

The command select_glyph_set is issued by the base station 12 to specify the glyph set to be used for subsequent drawing commands. The glyph_set parameter is a byte value. The base station 12 also issues a command insert_glyph to insert a glyph at the current insert point using the current glyph set. The command set_insert_point is issued by the base station 12 to set the upper-left corner for glyph drawing. The range of the x coordinates is zero to the maximum width of the display and the y coordinates are from zero to the maximum height of the display. The command set_glyph_spacing is issued by the base station 12 to define the increment used after inserting a glyph.

The system may include predefined commands to draw boxes, horizontal lines, or vertical lines; to specify the drawing width of from one to eight pixels; and to set a pattern that can be used to draw lines which repeat a given pattern, such as dashes. Fill operation may also be implemented by a series of commands that fill the entire screen, fill a rectangular area, fill a single pixel, or implement OR, exclusive OR, AND or NAND commands.

Graphic transfer operations may be implemented by a series of commands. The command define_rectangle defines the shape for various drawing and copying operations. Two coordinate pairs are specified defining opposing corners of the rectangle. The command set_source_bitmap defines the source bitmap for the draw operation. The define set_destination_bitmap defines the destination bit map for the draw operation. The command draw_rectangle causes the rectangle to be copied from the source bitmap to a destination bitmap (or the source, destination and size are set with other commands). The source bitmap may be defined using the set_source_bitmap command and the destination bitmap may be defined using the set_dest_bitmap command. Size may be defined using the define_rectangle command and the transfer mode may be defined using a set mode command. Other commands may be provided to allow a bitmap to be filled where the source of the pixel information is the command packet.

The command load_rectangle allows a bitmap to be filled where the source of the pixel information is the command packet. The command set_pixel_counter sets the pointer within the rectangle area. The command allocate_bitmap preserves the memory for storage of a symbol, whereas the command deallocate_bitmap deallocates the memory. The command set_display_surface specifies which of the display surfaces to display.

A command description table may be used to extract parameters from any RF stream between any linked components of the system 10. A command descriptor table is an ordered table containing two parameters per command, namely a pointer to the parameter descriptor for the command and a pointer to the command. These parameters are parsed and then executed. A descriptor contains one field describing the number of parameter types plus one entry per parameter that defines the type of each parameter.

Typically, there may be one parameter descriptor per command though commands are not precluded from sharing the same parameter descriptor. Different types of parameters may also be provided. For example, a parameter of type one may be decoded using the Huffman routine and may create a 1-byte parameter. A type two parameter may include a glyph code table which creates a one bit parameter. Other parameter types may have different numbers of bits and create either a one or two byte parameter.

Parameter validation and formatting into natural types such as byte, word or character may occur prior to invoking the command. This may simplify writing the command and validating the command.

A state machine may control the power consumption of a peripheral device such as a battery operated device having a keyboard. Examples of such devices may include keyboards, mice and remote control units. The controller 52 continually scans the keyboard looking for activity. It detects activity when the user is deemed to be active and the keyboard activity flag is set.

The controller also checks the keyboard activity flag and resets the timer and the flag if true. Otherwise, the controller increments the keyboard_activity_count variable and compares it against the keyboard_no_activity_timeout_value. If the timeout period is exceeded then the keyboard_timeout is set to true.

The controller 52 periodically checks the link to maintain synchronization. If it cannot contact the base station 12 then the RF_is_active variable is set to false. Otherwise, it is set to true. The controller 52 also checks the RF_is_active flag and resets the timer and flag if true. Otherwise, it increments the RF_no_activity_count and compares it to the RF_no_activity_timeout_value. If the timeout period is exceeded, then RF_timeout is set to true.

In a first state, a variable power_down represents the unpowered condition that happens when the user turns off power, the batteries run down, or the station 12 emits the power_down signal causing the power supply to remove power. The no_RF state occurs immediately after power is applied. If RF link synchronization occurs then the active state is entered. Otherwise, the controller alerts the user, awaits both the no_activity and no_RF_timeouts and then turns off by applying the power down signal to the supply.

The active state is the normal state with the RF link established and both the link and the controller 52 running at full speed. The controller transitions to inactive if no user activity occurs within the timeout period.

While in the inactive state, the controller requests that the synchronization period be maximized to reduce power consumption and it turns off the display device 14. If the controller detects keyboard activity, it goes back to active. If the link is lost, it goes to no_RF.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

determining if one of a predetermined number of command identifiers is available for transmission to a receiving device;

if not, awaiting a response from a receiving device including the command identifier;

upon receipt of the response including the command identifier, assigning the command identifier as the command identifier for a communication over a wireless link; and causing a device receiving a command and command identifier to respond to the command with that command identifier.

2. The method of claim 1 including transmitting a command to at least two devices, each of said devices maintaining a record of previously used command identifiers.

3. The method of claim 1 wherein transmitting said command over a wireless link includes transmitting a command from a processor-based system to a display device.

4. The method of claim 1 including developing a command sequence made up of packets of predetermined length.

5. The method of claim 4 including providing a header for said command sequence that includes the command packet length and a command identifier.

6. The method of claim 1 including assigning said command identifiers in a sequence.

7. The method of claim 6 including determining whether one of the commands in the sequence was not received.

8. The method of claim 6 including determining whether one of the commands in the sequence was not responded to by a receiving device.

9. A system comprising:

a controller; and a communications interface coupled to said controller such that said controller determines whether one of a plurality of command identifiers is available and if not, awaits a response from a receiving device including said command identifier to issue a communication using said same command identifier over a wireless link and to require a device receiving the command to respond to the command with the command identifier.

10. The system of claim 9 wherein said communications interface receives commands from an external device.

11. The system of claim 9 including a second device communicating with said interface through a wireless protocol.

12. The system of claim 9 wherein said controller determines whether one of a predetermined number of command identifiers is available.

13. The system of claim 9 wherein said system includes a processor-based station and a peripheral, each having communications interfaces such that said station and said peripheral communicate over said communications interfaces.

14. The system of claim 9 including a storage that stores a record of previously utilized command identifiers.

15. The system of claim 9 including a housing storing said controller and a display device coupled to said controller through a wireless protocol.

16. The system of claim 9 including a housing storing said controller and a wireless keyboard which communicates with said controller through a wireless protocol.

17. The system of claim 9 including a pair of devices each having a controller and a communications interface, said devices adapted to exchange commands between said devices, each of said commands having a command identifier, each of said devices responding to a command from the other of said devices by returning said command identifier.

18. The system of claim 17 wherein one of said devices determines whether or not a command has been responded to.

19. The system of claim 18 wherein said device that determines whether a command has been responded to, maintains a record of the command identifiers tnat have been issued and a record of the command identifiers utilized to respond to commands.

* * * * *